US008275117B2

United States Patent
Huet et al.

(10) Patent No.: US 8,275,117 B2
(45) Date of Patent: *Sep. 25, 2012

(54) METHODS AND APPARATUS FOR USE IN COMPUTER-TO-HUMAN ESCALATION

(75) Inventors: Francois Huet, Santa Cruz, CA (US); Damien Saint Macary, Mountain View, CA (US); Gray Salmon Norton, Portola Valley, CA (US); Stephen D. Klein, New York, NY (US); Timothy Kay, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/157,229

(22) Filed: Jun. 9, 2011

(65) Prior Publication Data

US 2011/0235797 A1  Sep. 29, 2011

Related U.S. Application Data

(63) Continuation of application No. 11/088,706, filed on Mar. 24, 2005, now Pat. No. 7,983,411.

(60) Provisional application No. 60/556,954, filed on Mar. 26, 2004.

(51) Int. Cl.
*H04M 3/00* (2006.01)
*H04W 4/00* (2009.01)

(52) U.S. Cl. ............................ 379/265.02; 455/426.2

(58) Field of Classification Search .......... 379/265.02–266.01; 455/426.2
See application file for complete search history.

(56) References Cited

U.S. PATENT DOCUMENTS

| 5,881,232 | A | 3/1999 | Cheng et al. |
|---|---|---|---|
| 6,430,602 | B1 | 8/2002 | Kay et al. |
| 6,513,063 | B1 | 1/2003 | Julia et al. |
| 6,587,558 | B2 | 7/2003 | Lo |
| 6,594,657 | B1 | 7/2003 | Livowsky |
| 6,615,240 | B1 | 9/2003 | Sullivan et al. |
| 6,643,622 | B2 * | 11/2003 | Stuart et al. ................... 704/275 |

(Continued)

FOREIGN PATENT DOCUMENTS

JP  2001-211437  8/2001

(Continued)

OTHER PUBLICATIONS

Amendment dated Dec. 12, 2011, Chinese Patent Application No. 200580014713.2.

(Continued)

*Primary Examiner* — Davetta W Goins
*Assistant Examiner* — Mohammad Islam
(74) *Attorney, Agent, or Firm* — Vierra Magen Marcus & DeNiro LLP (57) ABSTRACT

A system and method are provided for escalating a user or customer to a live agent from a conversational agent when predetermined criteria are met. The conversational agent textually converses in so-called natural language interaction and can run on a computer, such as a server. Upon receiving a first query, the conversational agent creates a new case, and interacts with the customer, in an attempt to resolve the case and satisfy the user. The predetermined criteria for escalation may include a determination that the conversational agent is unable to satisfy a computer-to-computer information request. Alternatively, the predetermined criteria may include patterns and/or words associated with frustration, for example, and/or unrecognized query subject matter, high priority queries, for example to increase sales, etc.

20 Claims, 10 Drawing Sheets

U.S. PATENT DOCUMENTS

| | | | |
|---|---|---|---|
| 6,643,650 | B1 | 11/2003 | Slaughter et al. |
| 6,694,316 | B1 | 2/2004 | Langseth et al. |
| 6,721,747 | B2 | 4/2004 | Lipkin |
| 6,741,980 | B1 | 5/2004 | Langseth et al. |
| 6,775,660 | B2 | 8/2004 | Lin et al. |
| 6,829,334 | B1 | 12/2004 | Zirngibl et al. |
| 6,829,603 | B1 * | 12/2004 | Chai et al. ............................ 1/1 |
| 6,981,256 | B2 * | 12/2005 | Jawahar et al. ............... 718/101 |
| 6,996,531 | B2 | 2/2006 | Korall et al. |
| 2002/0103917 | A1 | 8/2002 | Kay et al. |
| 2003/0074410 | A1 | 4/2003 | Kay et al. |
| 2003/0131061 | A1 | 7/2003 | Newton et al. |
| 2003/0179876 | A1 * | 9/2003 | Fox et al. .................. 379/265.02 |
| 2005/0047394 | A1 * | 3/2005 | Hodson et al. ................. 370/352 |
| 2005/0213743 | A1 * | 9/2005 | Huet et al. ............... 379/265.09 |
| 2006/0230422 | A1 | 10/2006 | Kunin et al. |

FOREIGN PATENT DOCUMENTS

| | | |
|---|---|---|
| JP | 2003188995 | 7/2003 |
| WO | WO02/065741 | 8/2002 |

OTHER PUBLICATIONS

Office Action dated Mar. 7, 2012, Chinese Patent Application No. 200580014713.2.
Office Action dated Nov. 26, 2008, U.S. Appl. No. 11/088,706, filed Mar. 24, 2005.
Response to Office Action dated Feb. 26, 2009, U.S. Appl. No. 11/088,706, filed Mar. 24, 2005.
Office Action dated May 26, 2009, U.S. Appl. No. 11/088,706, filed Mar. 24, 2005.
Response to Office Action dated Aug. 26, 2009, U.S. Appl. No. 11/088,706, filed Mar. 24, 2005.
Office Action dated Sep. 16, 2009, U.S. Appl. No. 11/088,706, filed Mar. 24, 2005.
Response to Office Action dated Feb. 16, 2010, U.S. Appl. No. 11/088,706, filed Mar. 24, 2005.
Office Action dated Apr. 26, 2010, U.S. Appl. No. 11/088,706, filed Mar. 24, 2005.
Response to Office Action dated Jul. 21, 2010, U.S. Appl. No. 11/088,706, filed Mar. 24, 2005.
Office Action dated Oct. 4, 2010, U.S. Appl. No. 11/088,706, filed Mar. 24, 2005.
Response to Office Action dated Mar. 10, 2011, U.S. Appl. No. 11/088,706, filed Mar. 24, 2005.
Notice of Allowance dated Apr. 14, 2011, U.S. Appl. No. 11/088,706, filed Mar. 24, 2005.
European Office Action dated Feb. 5, 2010, European Patent Application No. 05732476.6.
Chinese Office Action dated Feb. 12, 2010, Chinese Patent Application No. 200580014713.2.
Response to European Office Action dated Aug. 10, 2010, European Patent Application No. 05732476.6.
Japanese Office Action dated Aug. 30, 2010, Japanese Patent Application No. 2007-505182.
Response to Japanese Office Action dated Nov. 24, 2010, Japanese Patent Application No. 2007-505182.
Response to Office Action dated Aug. 11, 2011, Japanese Patent Application No. 2007-505182.
English translation of claims filed in Response to Office Action dated Aug. 11, 2011, Japanese Patent Application No. 2007-505182.
Office Action dated Oct. 10, 2011, Chinese Patent Application No. 200580014713.2.

* cited by examiner

| | | | Customer Care Console | | Steve | |
|---|---|---|---|---|---|---|
| 304a | 304b | 304c | 302 | 304d | | 304e |
| Action | Date | Reason | # messages | | Customer Request | |
| view \| call | 2005-03-08 17:47:47 | security | 3 | | : i lost my damn password | |
| view \| call | 2005-03-08 17:49:01 | Spain Package | 3 | | : i want to go to spain | |
| view \| call | 2005-03-11 20:32:15 | security | 4 | | : i lost my rotten password | |
| view \| call | 2005-03-11 20:34:12 | Spain Package | 4 | | : i want to go to spain | |
| view \| call | 2005-03-11 20:34:37 | frustration | | | : you suck | |

How to sign in to Webmail
Why do I have to sign in to the site more than once to check my Mail (Webmail) and access Account Management, Online Storage and Personal Web Pages?

Make a selection by typing a number or type "more" for more.

sales: i lost my damn password
Conversagent: We can call you to help you out.

Should somebody call you at 9174170321?

sales: yes
Conversagent: A customer care representative will call you at 9174170321 in approximately 3 minutes.

METHODS AND APPARATUS FOR USE IN COMPUTER-TO-HUMAN ESCALATION

CROSS REFERENCE TO RELATED APPLICATION

The present application is a continuation of U.S. patent application Ser. No. 11/088,706, filed on Mar. 24, 2005, which claims the benefit of U.S. Provisional Patent Application No. 60/556,954, filed on Mar. 26, 2004, and is incorporated herein by reference.

BACKGROUND

Traditionally, customer service has been provided over the telephone. A customer calls a company, waits on hold for the next available live agent, and then makes an information request to the live agent. To handle the calls, the company sometimes creates a call center staffed by a sufficient number of live agents to maintain hold times at a target maximum duration, for example. As the number of calls increases, either the company must hire more live agents, or the hold time increases.

The Internet offers a new vehicle for delivering customer support. By offering Internet-based customer service, a company has the potential to increase service quality, while at the same time reducing customer service costs. For instance, one known Internet solution connects a customer to a live agent, and enables the live agent and customer to textually communicate via instant messaging, E-mail, or a browser application rather than by telephone. One advantage is that a live agent can carry on textual conversations with multiple customers at once, thereby improving call center productivity.

In another known customer service model that avoids using a live agent, a customer inputs a query into a browser window in the form of a question or a keyword. The customer is then presented with a list of articles that might be relevant to the query. One characteristic is that the customer must select, such as by clicking on a link, the appropriate article from those presented, increasing the burden on the customer, and thereby decreasing the likelihood that the customer will choose to use this solution.

SUMMARY

The present invention provides systems and methods for escalating a user or customer to a live agent from a conversational agent when predetermined criteria are met. The conversational agent, which textually converses in so-called natural language interaction in an exemplary embodiment, can run on a computer, such as a server. Upon receiving a first query, the conversational agent creates a new case, and interacts with the customer, in an attempt to resolve the case and satisfy the user. In one aspect of the invention, the predetermined criteria for escalation include a determination that the conversational agent is unable to satisfy a computer-to-computer information request. In other aspects of the invention, the predetermined criteria include patterns and/or words associated with frustration, for example, and/or unrecognized query subject matter, high priority queries, for example to increase sales, etc.

Interacting with the customer involves receiving inputs from the customer and responding appropriately. A response might be a direct answer to a direct question, thereby resolving the case. A response might be a request for further information to help categorize the case. In response to the additional information, the response might be an answer that is formulated, based on the entirety of the interaction that resolves the case. Sometimes, based on the entirety of the interaction, the conversational agent determines that it is, by itself, unable to resolve the case. In such situations, the conversational agent will respond to the customer indicating that such a determination has been made. The conversational agent then escalates the customer to a live agent, and optionally forwards to the live agent at least a portion of a transcript of the conversation that has transpired between the conversational agent and the customer. In the event that the live agent receives at least a portion of the conversation transcript, the live agent may then review the transcript of the conversation between the customer and the conversational agent, and suggest a resolution to the customer's case based upon the transcript. One benefit of forwarding at least a portion of the conversation transcript to the live agent is that the customer does not have to repeat their queries to the live agent, since the live agent can understand the customer's case based upon the transcript.

In one aspect, the invention relates to a method of textually conversing with a customer to resolve a case. The method includes interacting with a customer and recording a transcript of the textual conversation, the conversation starting when a first query is received. Also included in the method are the steps of determining whether to send the customer a predetermined response to a query and escalating the customer to a live agent when sending a predetermined response to a query is determined to be inappropriate.

In one embodiment, the step of determining whether to send the customer a predetermined response includes evaluating whether the customer desires to converse with a live agent, such as by textual chat, instant messaging, and/or telephone. The step of determining whether to send the customer a predetermined response can also include evaluating whether the query matches an existing pattern or whether the customer has repeated the query. Escalating the customer to the live agent can include allowing the live agent to enter the textual conversation as a third party. In an alternative embodiment, the step of escalating the customer to the live agent includes providing the customer with estimated wait times to converse (textually or telephonically) with a live agent, and enabling the customer to select between waiting for the live agent and being provided with contact information for the live agent.

In other embodiments, the step of escalating the customer to the live agent includes providing the customer with a telephone number of the live agent and/or waiting times before the live agent is available to converse. Escalating the customer to the live agent can also include receiving contact information from the customer and forwarding to the live agent the customer contact information.

In another embodiment, escalating the customer to the live agent further includes determining a category of service required, and escalating the query to a live agent who specializes in that category.

Escalating the customer to a live agent can include providing the live agent with at least a portion of the transcript of the textual conversation. The live agent can be provided with the at least a portion of the transcript of the textual conversation prior to the live agent being connected with the customer. The method can also include continuing to converse with the customer prior to connecting the customer with the live agent, giving time for the live agent to review the at least a portion of the transcript of the conversation.

In another embodiment, escalating the customer to the live agent includes conversing with the customer through at least one of email, telephone, and an on-line conversation. The method can also include proposing a response to a query to the live agent, the live agent selecting between sending the proposed response to the customer and generating a different response to address the customer's query.

In another aspect, the invention relates to a method for obtaining an answer to a query. The method includes sending a query to a conversational agent, and receiving a response to the query from at least one of the conversational agent and a live agent. In one embodiment, the step of sending a query to a conversational agent includes requesting to converse with the live agent. The method can further include providing the conversational agent with contact information and/or receiving from the conversational agent contact information for the live agent.

In another aspect, the invention relates to a system for responding to customer queries. The system includes a first module for receiving textual queries from a customer. Also included in the system is a second module for storing predetermined responses to customer queries. A third module may be included for selecting between providing a predetermined response to a customer query and escalating the customer to a live agent. A fourth module may also be included in the system for recording the received queries and the predetermined responses sent to the customer.

BRIEF DESCRIPTION OF THE DRAWINGS

The invention will be more fully understood from the following detailed description taken in conjunction with the accompanying drawings, in which.

DETAILED DESCRIPTION

Figure 1:
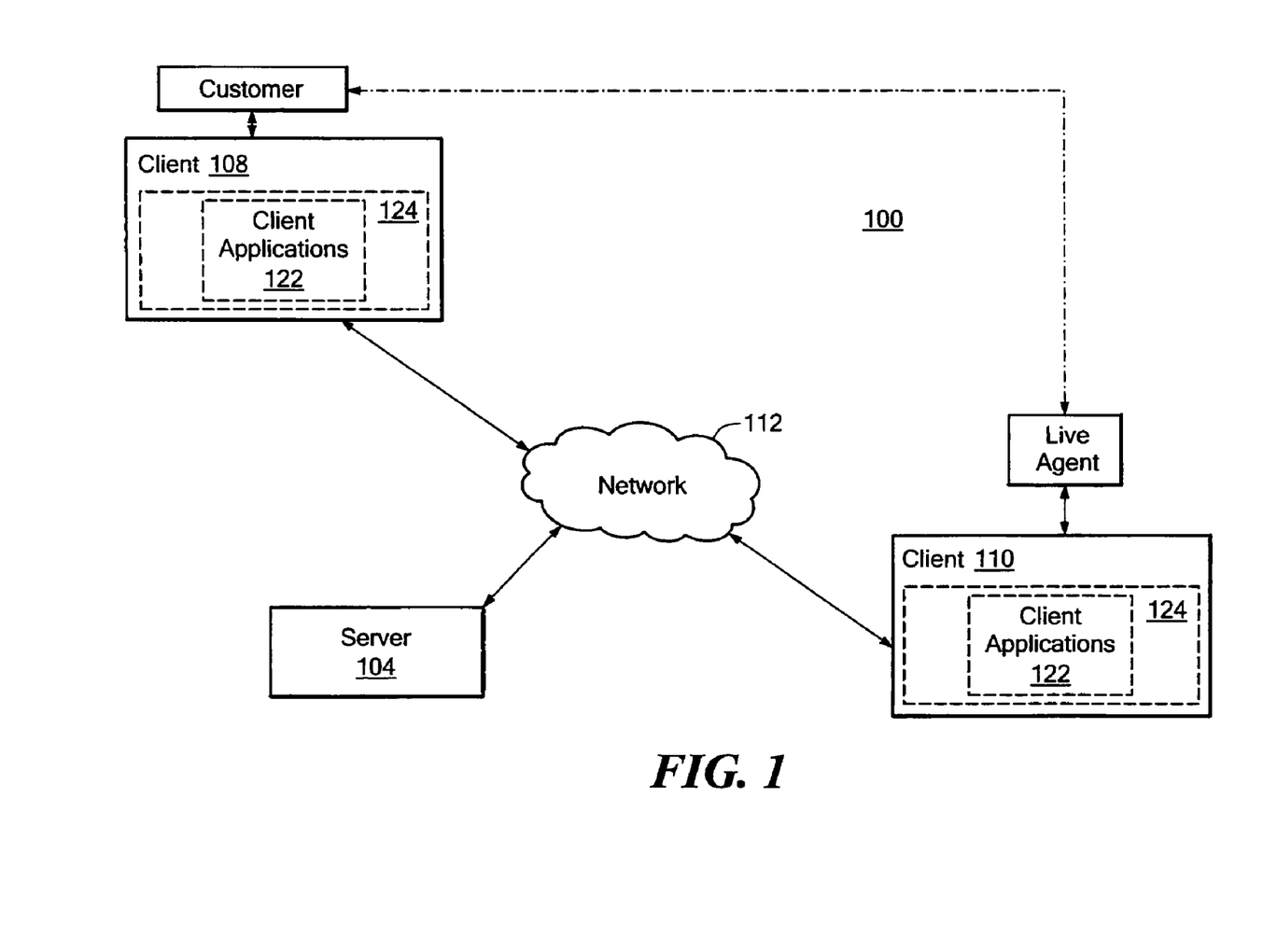
FIG. 1 is a block diagram of the system in accordance with one embodiment the invention.

FIG. 1 shows an exemplary embodiment of a system 100 for responding to user or customer textual queries, or more broadly user messages, and selectively providing escalation to a live agent. Escalation occurs when predetermined criteria are met. The conversational agent, which can include an automated service agent (ASA), responds to user queries in a conversational (natural language) manner in attempt to provide the appropriate information to the customer. If the conversational agent is unable to provide a satisfactory response to the customer, for example, the case can be escalated to the live agent. Unsatisfactory response to a user query can be one of the predetermined criteria for escalation of the case. With this arrangement, the dynamic of how customers are served is enhanced by improving the user experience and giving attention to the time needs of the user, rather than forcing the customer to push buttons to navigate to the proper call-center area, then waiting for a representative, and the like.

Figure 1A:
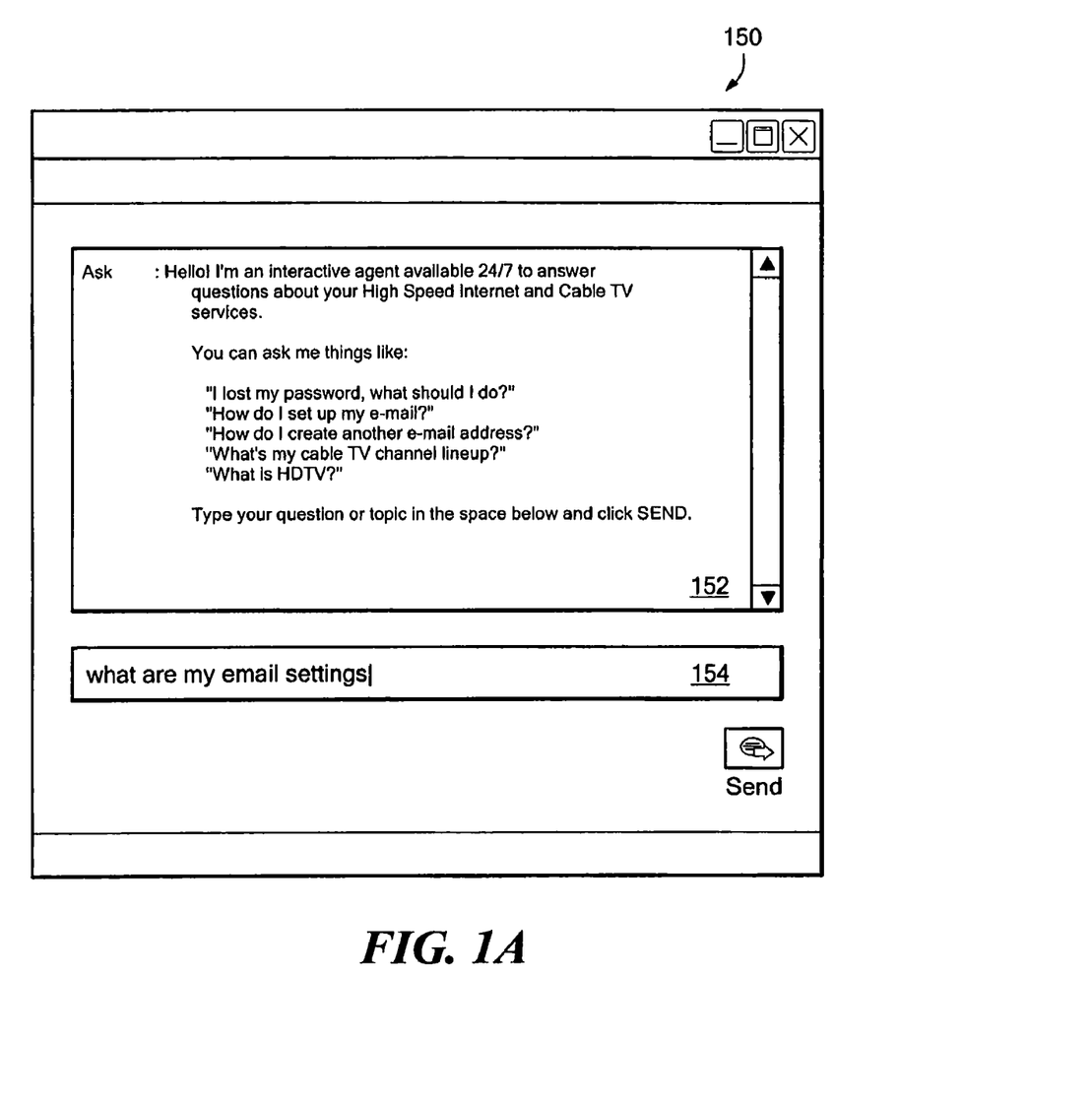
FIG. 1A is a pictorial representation of a user interface that can provide case escalation in accordance with the present invention.

The customer first communicates with a conversational agent by posing a textual query to the conversational agent, thereby starting a case. FIG. 1A shows an exemplary window 150 providing an interface to enable a user to type in queries to which the conversational agent can respond and attempt to service the customer request for information. The window 150 includes a first portion 152 in which the conversational agent can generate text and a second portion 154 in which a customer or user can generate textual queries. In an exemplary embodiment, the interaction between the client and the conversational agent is 'conversational' in nature. The client types in queries and the conversational agent provides textual answers having some similarity to an answer that may be provided in a verbal conversation. U.S. application Ser. No. 10/227,595, filed on Aug. 23, 2002, which is incorporated herein by reference, discloses an exemplary system having natural language textual interaction.

The conversational agent is a computer program that evaluates the query provided by the customer. As described more fully below, if the conversational agent determines that it is unable to resolve the case or that the case is best resolved by a live agent, the conversational agent escalates the customer to the live agent. Escalation offers to a live agent can include telephone calls (in either direction), instant messages, mobile text messages, and the like. As described below, escalations can interact with a company call-center system, for example, to perform one or more of the following: determine an appropriate agent to route the customer to based upon line of inquiry and areas-of-agent-expertise; inform a customer of estimated time for a response from company based on a hold queue in appropriate agent area; and pass potentially relevant information to the call-center system live agents or other representatives to reduce response pendency time. Illustrative information includes time stamp, reason for escalation, query that generated the escalation, answers to a set of questions, entire log, phone number or other contact information (e.g., E-mail address, mobile text address, etc). An illustrative customer-conversational agent (CA) interaction is set forth below:

CA: How can I help you?
Customer: I'm having trouble logging in.
CA: what kind of trouble are you having?
  1) You lost your user ID or password
  2) You are having trouble connecting to the Internet.
  3) . . .
  4) . . .
Customer: I lost my password.
CA: We can have someone contact you to help you out with that.
Would you like someone to call you to help?
Customer: Sure. That would be excellent.
CA: What is your phone number?
Customer: It's 212.555.4587
CA: We'll have one of our online security experts call you in about 4 minutes.
Customer: thanks. I'll be waiting by the phone.

In the above dialog, the conversational agent obtained a telephone number at which to contact the customer. Note that in the above, a live agent within a group of security experts was selected based upon the subject matter of the customer input.

In the illustrative dialog above, after the subject matter area (security) was identified by the conversational agent, a call center queue in the online security area was queried and provided a wait of 4 minutes. This variable was conversationally passed to the customer, adding a level of satisfaction to the experience by alleviating the typical hold-time 'panic' associated with known customer service models. With this arrangement, the dynamic of how customers are served is changed from conventional link lists and unknown queue times to gracefully serving client needs with attention to their time needs. This is in contrast to traditional company models where customers are forced to push buttons for navigating to the appropriate call-center area, then waiting an unknown time for a call center representative.

As set forth below, the customer can be offered a plurality of escalation options:

CA: How can I help you?
Customer: I'm having trouble logging in.
CA: what kind of trouble are you having?
   1) You lost your user ID or password
   2) You are having trouble connecting to the Internet.
   3) . . .
   4) . . .
Customer: I lost my password.
CA: We can have someone contact you to help you out with that.
How would you like us to contact you?
   1) by phone
   2) by email
   3) by Instant Message
   4) by mobile text message
Choose a number from the list above, or just tell me how you would like to be contacted.
Customer: send me a text message.
CA: What is your mobile number?
Customer: It's 917.555.4587
CA: We'll have one of our online security experts text you in about 4 minutes.
Customer: thanks.
CA: We're glad to be of service In one embodiment, prior to the transfer of the customer to the live agent, or at the time of the transfer of the customer to the live agent, the live agent may be provided with at least a portion of the transcript of the conversation that has transpired between the conversational agent and the customer. The live agent can also receive existing log-in information and pass any information resident in a corporate database of user accounts, for example, into the call center, to speed ability of a live agent to solve the problem. A record of the case, which can include a transcript, can be made and associated with the user's account.

Referring again to FIG. 1, the system 100 includes at least one server 104, a first client 108 operated by a customer, and optionally a second client 110 operated by a live agent. The clients 108, 110 are preferably implemented as software running on personal computers (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and Linux from RED HAT, INC. of Durham, N.C. (and others). The clients 108, 110 could also be implemented on such hardware as a smart or dumb terminal, network computer, personal data assistant, wireless device, information appliance, workstation, minicomputer, mainframe computer, or other computing device that is operated as a general purpose computer or a special purpose hardware device solely used for serving as a client 108, 110 in the system 100.

In an exemplary embodiment, the client 108 is operated by a customer of the system 100 to send queries over a network 112 and to receive information from the conversational agent or a live agent in response to the queries. The client computer 108 includes client applications 122. One example of a client application 122 is a web browser application that allows the client 108 to request a web page (e.g. from the server 104) with a web page request. An example of a web page is a data file that includes computer executable or interpretable information, graphics, sound, text, and/or video, that can be displayed, executed, played, processed, streamed, and/or stored and that can contain links, or pointers, to other web pages. In one embodiment, a customer using the client 108 manually requests a web page from the server 104. Alternatively, the client 108 automatically makes requests with the web browser. In another embodiment, the client 108 automatically makes requests via mechanisms other than web protocols. Examples of commercially available web browser software are INTERNET EXPLORER, offered by Microsoft Corporation of Redmond, Wash., and NETSCAPE NAVIGATOR, offered by AOL/Time Warner of Mountain View, Calif. The web browser is one possible example of a client application 122, and others may include word processors, spreadsheets, operating system extensions, email clients, instant messaging clients, custom applications, as well as others.

A communications network 112 connects the client 108 with the server 104 and optionally the second client 110 that is operated by a live agent. The communication may take place via any media such as standard telephone lines, LAN or WAN links (e.g., T1, T3, 56 kb, X.25), broadband connections (ISDN, Frame Relay, ATM), wireless links, and so on. Preferably, the network 112 can carry TCP/IP protocol communications, and HTTP/HTTPS requests made by the web browser. The type of network 112 is not a limitation, however, and any suitable network 112 may be used. Typical examples of networks 112 that can serve as the communications network 112 include a wireless or wired ethernet-based intranet, a local or wide-area network (LAN or WAN), and/or the global communications network known as the Internet, which may accommodate many different communications media and protocols.

An administrator operates a central server 104, which interacts with clients 108, 110. The server 104 is preferably implemented on one or more server class computers that have sufficient memory, data storage, and processing power and that run a server class operating system (e.g. SUN Solaris, Linux, MICROSOFT WINDOWS 2000, or other such operating system). Other types of system hardware and software than that described here could also be used, depending on the capacity of the device and the number of customers and the amount of data received. For example, the server 104 may be part of a server farm or server network, which is a logical group of one or more servers. As another example, there could be multiple servers 104 that may be associated or connected with each other, or multiple servers could operate independently, but with shared data. As is typical in large-scale systems, application software could be implemented in components, with different components running on different server computers, on the same server, or some combination.

Figure 2:
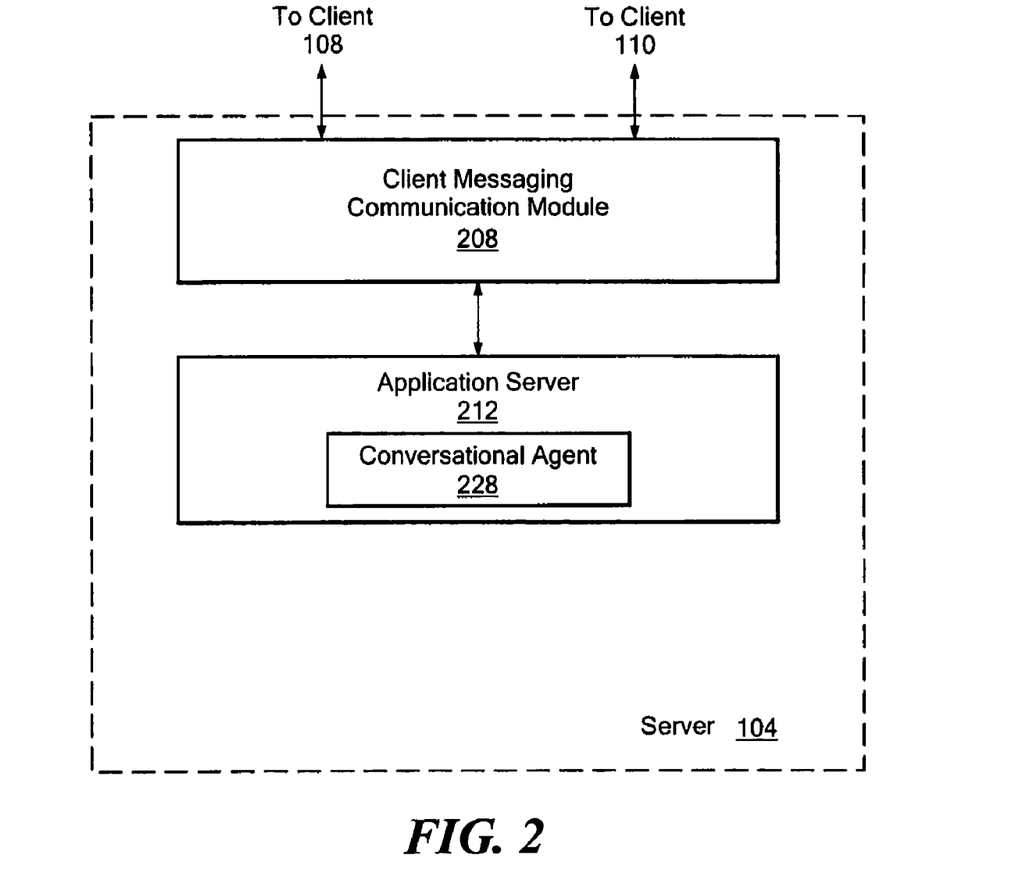
FIG. 2 is a block diagram of the server of FIG. 1 in accordance with one embodiment of the invention.

With reference to FIG. 2, in one embodiment, the server 104 includes a client messaging communication module 208 (the first module) that is the interface for communication with clients 108, 110 involving HTTP/S requests and responses, Java messages, SMTP messages, POP3 messages, instant messages, as well as other electronic messages. According to the invention, the first module can send messages from the client 108, 110 to the server 104, and from the server 104 to the client 108, 110 such that interactive communication is established. The client messaging communication module 208 can be implemented as software running on one or more servers, or may be implemented as a stand-alone server.

The client messaging communication module 208 communicates with an application server 212, which provides the main programming logic for the operation of the system 100. In one embodiment, the application server 212 is implemented as one or more application programs, such as a conversational agent 228, running on a server class computer, which may be the same or different computer as the client messaging communication module 208. The application server 212 receives queries from the customer via the client messaging communication module 208. The query sent by the customer may consist of keywords or a so-called natural language query in the form of sentences. For example, the customer may enter the natural language query "How do I configure Outlook?" or the keyword query "Configuration."

With continued reference to FIG. 2, in one embodiment, when a query sent by the customer is received by the application server 212, the application server 212 compares the query received using a second module to a set of query strings pre-programmed in a third module, for example, the conversational agent 228. In another embodiment, the third module can be a database that stores pre-determined queries. Based on the results of the comparison, the conversational agent 228 may either send a response to the customer, ask the customer to provide more information, or escalate the customer to a live agent.

With continued reference to FIG. 2, in one embodiment, when a query sent by the customer is received by the application server 212, the application server 212 compares the query received using a second module to a set of query strings pre-programmed in a third module, for example, the conversational agent 228. In another embodiment, the third module can be a database that stores pre-determined queries. Based on the results of the comparison, the conversational agent 228 may either send a response to the customer, ask the customer to provide more information, or escalate the customer to a live agent.

Figure 3:
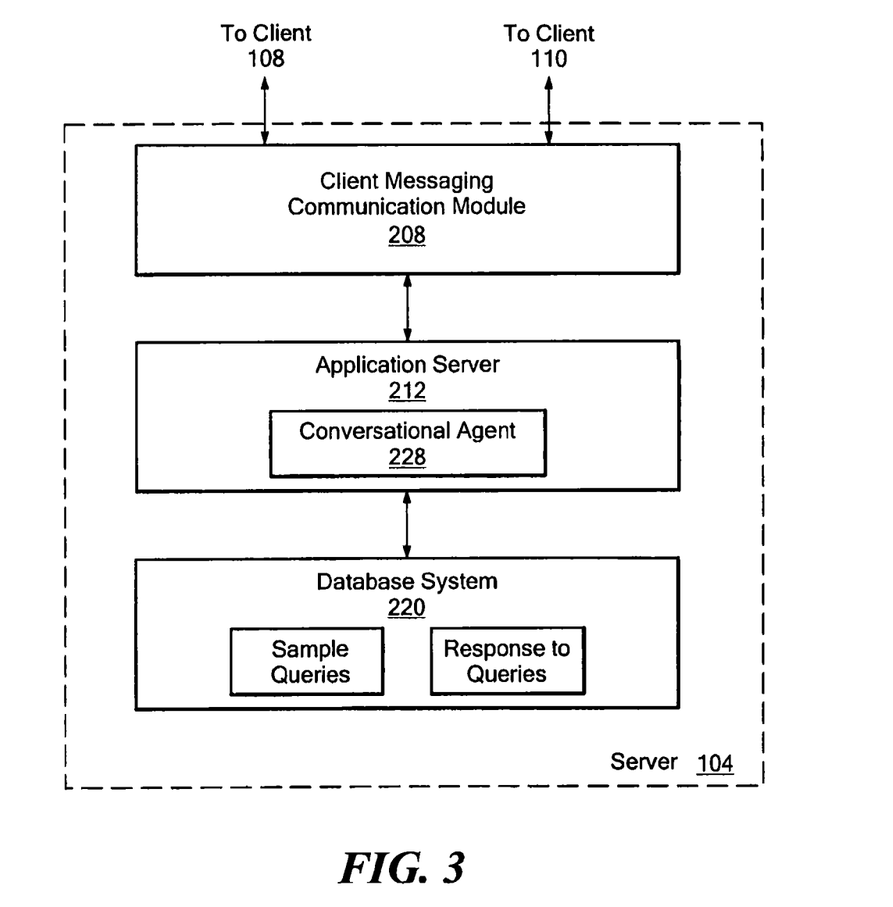
FIG. 3 is a block diagram of the server of FIG. 1 in accordance with another embodiment of the invention.

In one embodiment of a server 104 that includes a database 220, when a query is received by the application server 212, the conversational agent 228 retrieves a list of related queries from the database 220, and evaluates the similarity of the query received to the queries stored in the database using the second module. The conversational agent 228 then determines the most relevant query stored in the database 220, which may point the conversational agent 228 to another location in the database 220 containing an appropriate response to the query. The conversational agent 228 then retrieves the response from the database 220, and forwards the response to the customer via the first module. In the alternative, if the conversational agent 228 is unable to find a matching query in the database 220, the conversational agent 228 may prompt the customer for more information, or may escalate the customer to a live agent as previously described. In general, the database 220 can be used to store any information that was previously programmed into the conversational agent 228.

Figure 4:
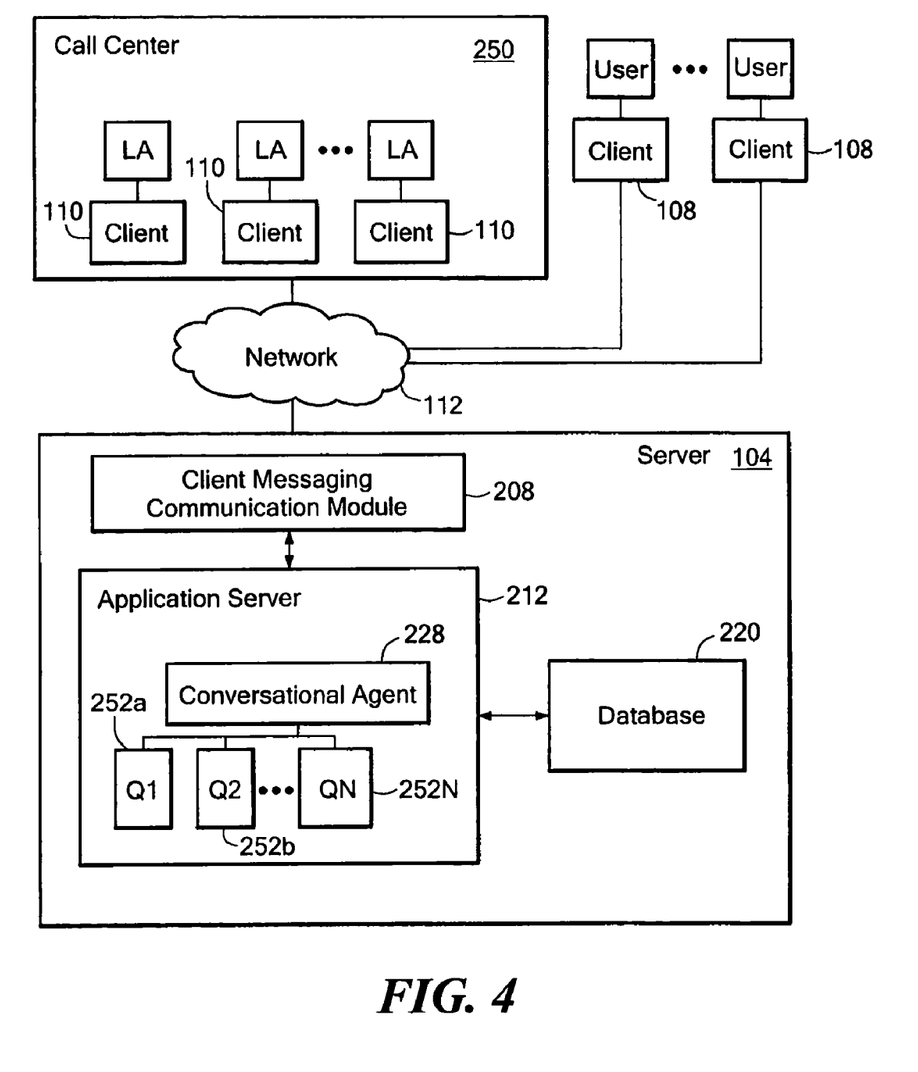
FIG. 4 is a block diagram of a system providing case escalation that utilizes a call center.

FIG. 4 shows an exemplary embodiment having a call center 250 in which a plurality of live agents interact via clients 110 and the network 112 with various user clients 108. The conversational agent 228, which can reside on the server 104, provides information for escalated cases to the call center 250 for action by the live agents. The conversational agent 228 can categorize cases and place them in corresponding queues 252a-N. Transcript (record), time stamp, reason, user ID, and other information for the case or user can be stored in conjunction with the queue entry. Information can be stored in the queue, database 220 or other suitable location.

It is understood that the location of the various components can vary to meet the needs of a particular location. For example, while the call center is shown to be remote from the conversational agent 228, in other embodiments the call center can be local to the application server 212 and conversational agent. A wide variety of configurations are possible without departing from the present invention as will be readily apparent to one of ordinary skill in the art.

The conversational agent interacts with the customer or user in an attempt to provide the information requested by the user. The information sent by the user is examined by the conversational agent to generate responses that satisfy the user and/or escalate the user to a live agent based upon predetermined criteria. It will be appreciated that the predetermined criteria can vary based upon a desired response by the conversational agent.

Figure 5A:
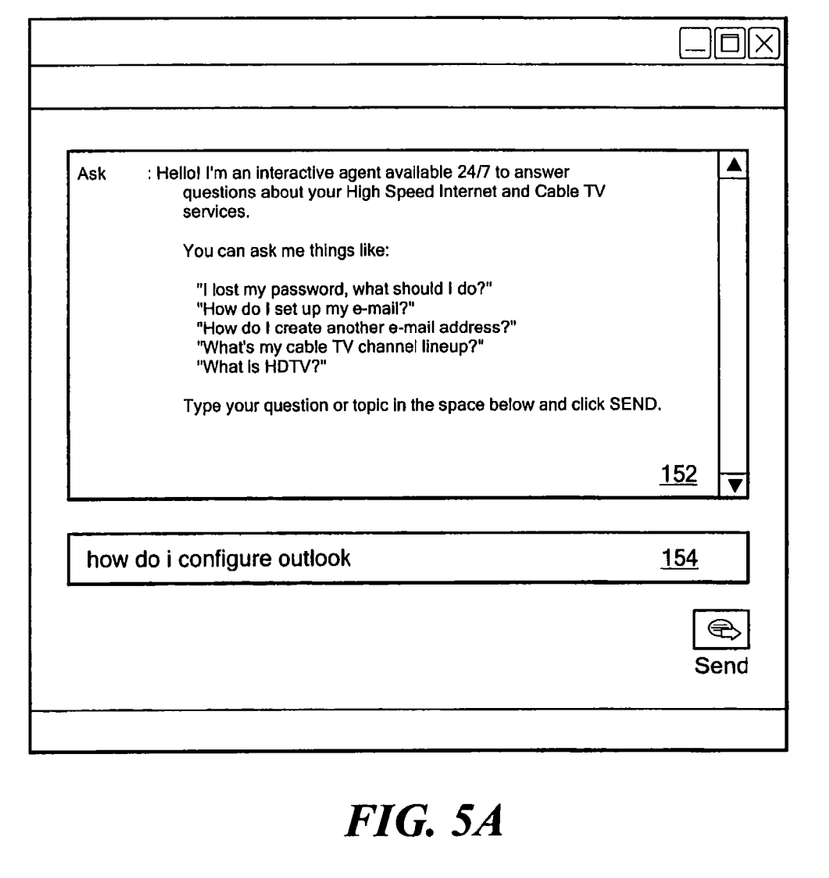
FIGS. 5A-D are pictorial representations of exemplary dialog between a conversational agent and a user.
Figure 5B:
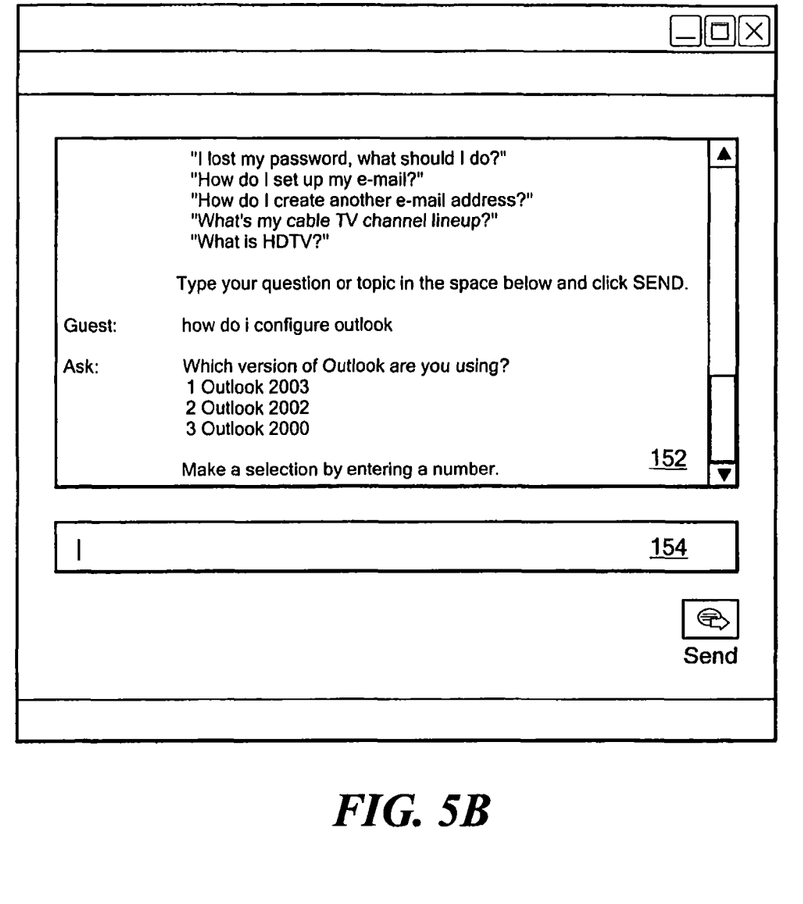
Figure 5C:
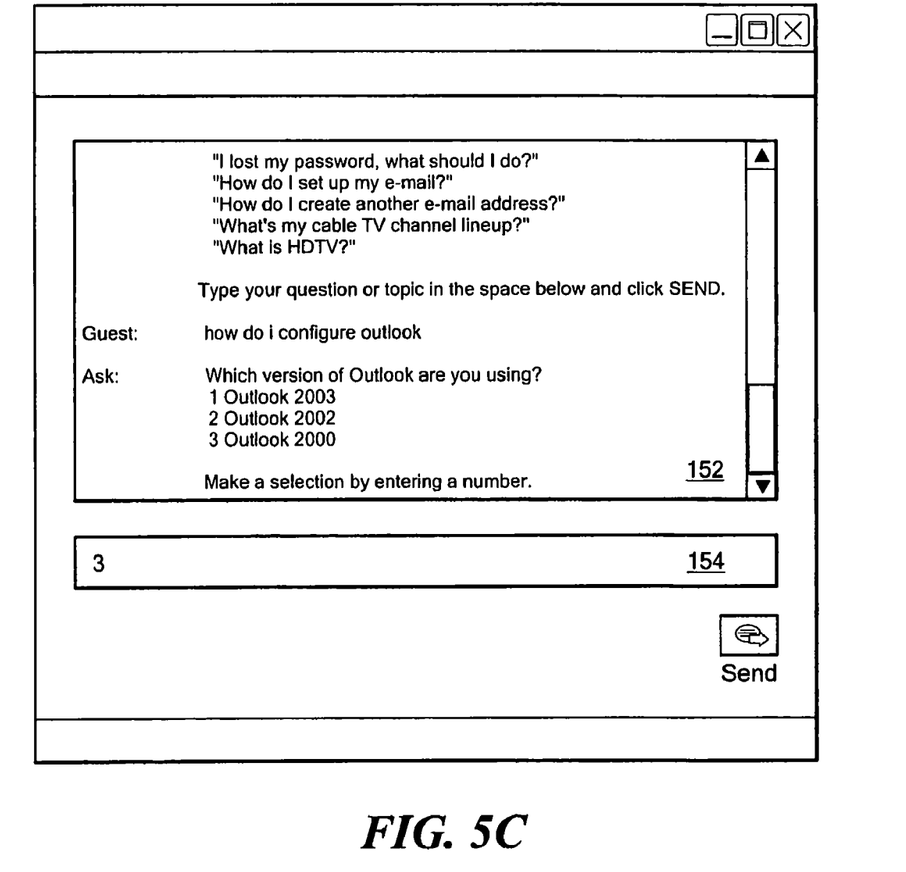
Figure 5D:
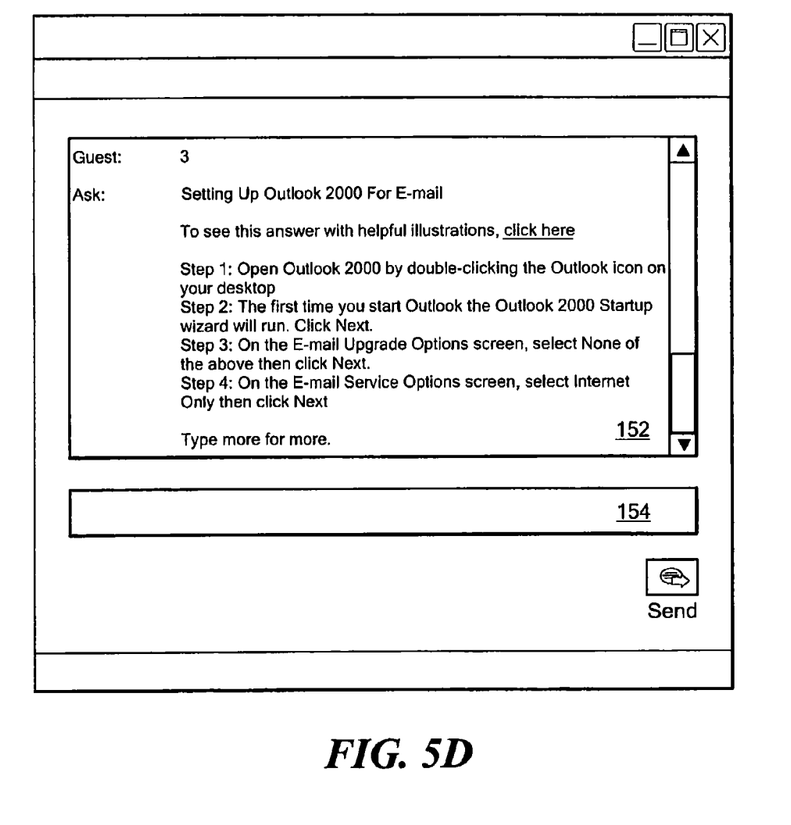

As shown in FIG. 5A, if a customer asks "How do I configure Outlook?" in the first portion 152 of the display, the conversational agent 228 may reply "Which version of Outlook are you running?" in the second portion 154 of the display and provide a list of supported versions, as shown in FIG. 5B. Once the customer enters the version, as shown in FIG. 5C, the conversational agent 228 can provide further pre-programmed responses to, for instance, guide the customer through a product configuration, as shown in FIG. 5D. Depending upon the performance of the conversational agent 228, some fraction of cases may be resolved satisfactorily by the conversational agent 228 alone.

In other instances, however, it may be desirable for a live agent to resolve the case after the customer has first interacted with the conversational agent 228. In one embodiment of the invention, the conversational agent 228 using the second module detects whether it can, by itself, resolve the customer case. When the conversational agent 228 determines that it cannot by itself resolve the customer case, it may escalate the customer to a live agent.

There are a variety of criteria that the conversational agent 228 can use to determine whether it can resolve the customer case. For example, the customer may request to be escalated to a live agent by asking something like "Can I talk to somebody real?" When the conversational agent 228 receives this query from the customer, the computer program can be coded to escalate the customer to a live agent. In one embodiment, the conversational agent can be programmed to make it harder or easier to contact a live agent.

In an exemplary embodiment, after determining that the case should be escalated to a live agent, the conversational agent can first ask the customer a number of questions (e.g., location, product ID, etc.) before escalating to the live agent. The obtained information can be passed to the live agent. It is understood that the set of questions can be different depending upon the reason for escalation. For example, for inquiries on a currently discounted trip to Spain, the line of inquiry might be date of departure, number of travelers, etc. Similarly, for a password issue questions may include username, account number, etc.

As another example, the customer may express frustration when conversing with the conversational agent 228. For instance, the customer might type in "I hate talking to a computer." In this situation, the conversational agent 228 can be configured to escalate the customer to a live agent.

As another example of a case where the conversational agent 228 may escalate the customer to a live agent, the customer may type in "What's the price of tea in China?" In this case, when the customer query fails to match existing knowledge stored in the third module, a live agent may be summoned to assist the customer. As another example, the customer asks, "How many minutes do I have left on my long distance phone card?" If the conversational agent is unable to attain this information, the conversational agent may inform the customer that account information is not yet available and may further determine to escalate the customer to a live agent.

Another situation in which the customer query may be escalated to a live agent occurs when the customer provides queries to the conversational agent 228 that fit a detectable pattern of repetition. For instance, the customer may type in the same, or substantially similar, question a predetermined times in a row, may hit the return carriage in frustration several times, or hold down a key, etc. Upon detection of such frustration-related user input, the conversational agent can determine that the user case should be escalated to a live agent.

It should be understood that there are many patterns that can be pre-programmed into the conversational agent 228 that result in the customer being escalated to a live agent. For example, any combination of the above examples may cause the conversational agent 228 to determine that it is unable, by itself, to resolve the case. In another embodiment, a customer may be escalated to a live agent if the case relates to a topic area that is deemed to be sufficiently important to be handled by a live agent. For instance, if a customer asks "what are the fifteen-year fixed mortgage rates?", the customer can be escalated to a live agent who can better assist him. Or a customer may ask about a currently discounted travel package. Thus, certain topics may be give priority for escalation to a live agent.

With further reference to FIG. 1, also shown in the system 100 is a live agent. The live agent may be located, for instance, in a call center as described above. The live agent may be in communication with the server 104 over the same network 112 as the customer or over a different network. When it is determined that the conversational agent 228 is unable, by itself, to resolve the case, the conversational agent 228 may escalate the customer to the live agent by sending a communication to the live agent indicating that the services of the live agent are required. As part of the communication provided to the live agent, the conversational agent 228 may send a copy of the communication that has transpired between the conversational agent 228 and the customer, as will be described.

A customer can be escalated to a live agent in a variety of ways. For instance, a link to the live agent can be provided to the customer by the conversational agent 228. Alternatively, the email address of the live agent can be provided, or the live agent's telephone number. When a customer is escalated to a live agent, a live agent communicates with the customer to help resolve the customer's query. The escalation of the customer to the live agent may result in the live agent taking over for the conversational agent 228 to resolve the customer's case.

In an alternative embodiment, the live agent may join the conversation with the customer as a third party. For example, the customer and the conversational agent 228 are the first two parties, conversing in a text channel over the network 112, and the live agent is added as a third party to the text channel. The communications sent by any of the three recipients may be presented to the other two participants. Alternatively, when the customer enters a query, the conversational agent 228 may propose a response to the query to the live agent, but not the customer. The live agent can then evaluate whether to send the proposed response of the conversational agent 228 to the customer, or generate a different response to address the customer's query.

In another embodiment, in response to a customer query, the conversational agent 228 may forward a database link to the live agent. For example, if the customer asks "what are current long term mortgage rates?" the conversational agent 228 may direct the live agent to a database entry or to a web page containing data on current mortgage rates so that the live agent can better resolve the customer's case. In general, the conversational agent 228 can be programmed to point the live agent to any reference deemed relevant to resolving the customer's case.

As illustrated in FIG. 1 by the dashed line, in other embodiments, the live agent converses with the customer over an external network, such as a telephone, rather than through the network 112. For instance, when the conversational agent 228 determines that the customer should be escalated to a live agent, the conversational agent 228 presents a customer service telephone number to the customer. The customer then dials the phone number, waits in the queue, and talks with the live agent. Alternatively, the customer is provided with the current wait time to speak with a live agent, and is instructed to contact the live agent after a given period of time has lapsed, thereby limiting the wait time of the customer on the telephone. As an alternative, when the conversational agent 228 determines that escalation is appropriate, the conversational agent 228 prompts the customer to provide their contact information, for instance, their telephone number. The customer is then told by the conversational agent 228 that a live agent will contact them as soon as they are available to help resolve their query, enabling the customer to complete other tasks while they wait to converse with a live agent.

In another embodiment, the conversational agent 228 can present a choice of escalation methods to the customer, as well as information that may help the customer make a decision which escalation method best meets their needs. As one example, the information presented to the customer may include expected wait time. The expected wait time may include the time necessary for the live agent to familiarize himself with the case, including the time to read the session transcript, as will be further described.

It is understood that the term escalation should be construed broadly to include offers of escalation to a user, in any suitable communication medium, as well as automatic escalation. For example, if a conversational agent is unable to resolve a case, for selected topics, e.g., trip to Spain, the conversational agent may inform the user that the case has been escalated and that a live agent will be contacting the user. The conversational agent communicates with a call center, for example, to inform the call center that a user should be contacted as soon as possible for the given topic. If the conversational agent can obtain a telephone number from a database for the user, the conversational agent can inform the user that a live agent will call the user at the previously provided telephone number, or other communication address. The user can optionally be given a chance to say 'no' to the escalation.

When escalating the customer, the conversational agent 228 may determine a service category that is required, and escalate the customer to a live agent that is competent to address queries falling into that category. For instance, the conversational agent 228 may determine that a customer needs to communicate with a live agent in the Cable TV department rather than a live agent in the Cable Modem department, and can appropriately escalate the customer. Separate queues can be generated for the various categories.

As referred to above, when the conversational agent 228 escalates the customer to a live agent, a session transcript that may contain the text of the entire interaction between the customer and the conversational agent may be forwarded to the live agent. As an alternative, the customer can select which portion of the transcript will be forwarded to the live agent. The transcript is created by the conversational agent 228 in a fourth module at the time the customer enters their first query and thereafter records all communications between the conversational agent 228 and the customer. The transcript may be studied by the live agent prior to conversing with the customer, thereby eliminating the need of the live agent to repeat questions already posed to the customer. By avoiding repetition, the live agent can more quickly come to understand the query, and can more quickly resolve it, thereby reducing customer frustration, and also reducing service costs. In addition to obtaining a transcript of the conversation between the conversational agent 228 and the customer, the live agent can be provided with other information such as the length of time the customer has been conversing with the conversational agent 228, and transcripts from sessions that may have occurred prior to the current session.

Figure 6:
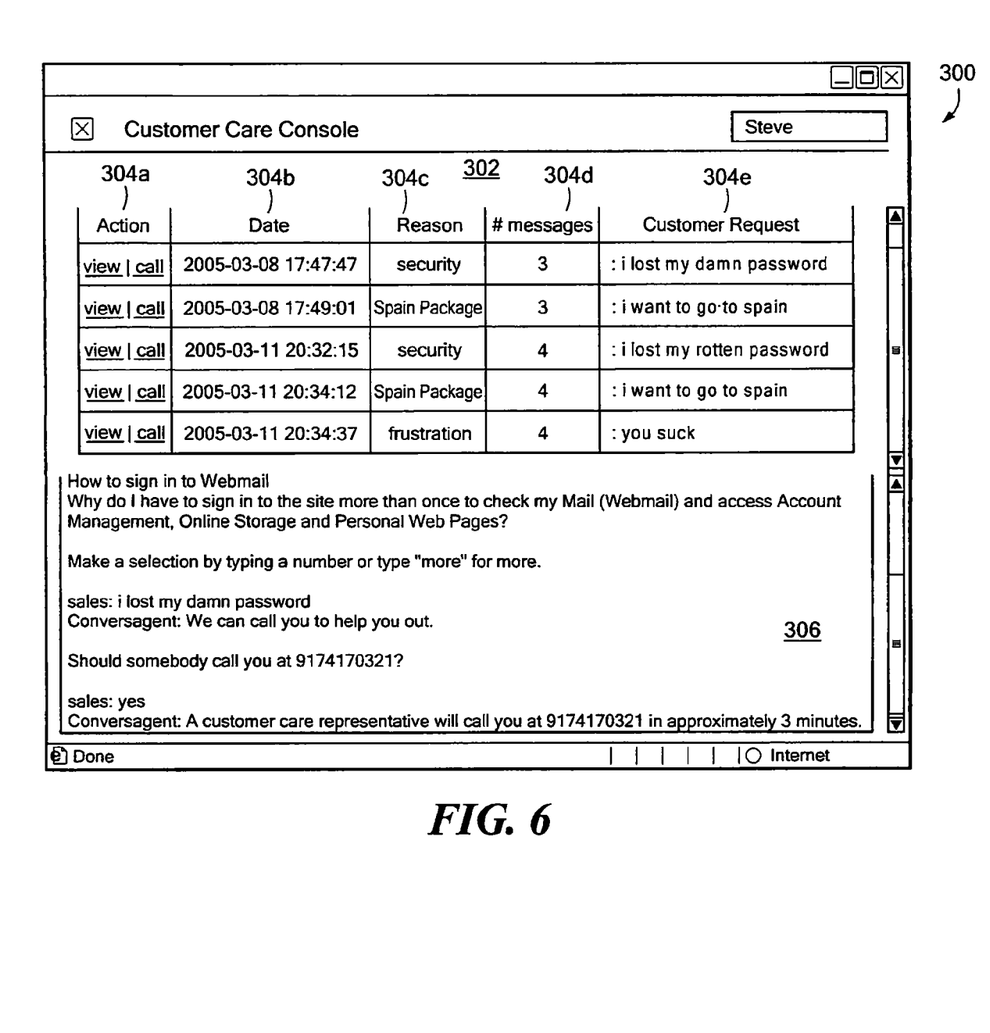
FIG. 6 is a pictorial representation of an exemplary interface for a live agent showing escalated case information.

FIG. 6 shows an exemplary screen display 300 for a live agent after escalation. The display 300 includes a queue 302 of customers that have had cases escalated. In one embodiment, a table is provided having respective columns for action 304*a*, date 304*b*, reason for escalation 304*c*, number of messages 304*d*, and customer request or query 304*e*. The conversational agent has categorized each escalated case as indicated in the reason column 304*c*. For example, user queries regarding a currently discounted trip to Spain will be categorized as "Spain package" in the reason column 304*d*. A travel company, for example, may want to escalate 'Spain' inquiries to a live agent immediately if interaction with a live agent will increase the likelihood of a generating a trip booking. Password issues can be categorized as "security." Issues relating to rising customer irritation can be categorized as "frustration," for example.

For a selected case, the display 300 can also include a region 306 to contain a transcript of the interaction between a customer and the conversational agent. The transcript can include contact information obtained from the client. In cases where the customer is known, a database can be queried to pull up customer information for display.

It is understood that the entity providing the conversational agent can designate a wide variety of criteria for queuing escalated cases to be handled by the live agents. For example, potential sales, such as the "Spain package" can be placed higher in a queue than security cases. In one embodiment, a live agent can select which case to address based upon directions from a supervisor.

In addition to informing the live agent of the conversation between the customer and the conversational agent 228 that has already transpired, the transcripts are useful for other purposes as well. For instance, the session transcripts can be examined to determine how to improve the conversational agent 228. When a transcript shows relevant questions that the conversational agent 228 has been unable to answer, for example, because the conversational agent knows that it is unable to answer the question, or because the conversational agent has provided the wrong answer to the customer, the conversational agent 228 may be updated to better address those questions in the future, thereby generating cost savings. By continuously updating the conversational agent 228, the conversational agent 228 becomes more adept at successfully responding to customer queries.

In another embodiment, each case can be logged and tracked to determine, for example, number of escalations. Calculated information can be presented to an entity providing the conversational agent as raw data, percentage of total sessions escalated, escalation by topic area, and the like.

Similarly, the transcripts can be evaluated to determine how to expand the scope of the conversational agent 228. If transcripts frequently show questions that were originally considered to be outside the scope of relevance, the company may decide to expand the scope of the conversational agent 228 to address these questions. Similarly, if it is determined that customers become frustrated with a response frequently provided by the conversational agent 228, the response can be altered to be more customer friendly. In general, the transcripts provide feedback that can be used to continuously update the conversational agent 228, thereby reducing the number of cases that need to be forwarded to a live agent, and also the time required by the live agent to resolve the customer's query with cost savings to the company.

While the invention is primarily shown and described as having textual interaction between a user and a conversational agent, it is understood that voice can be used instead of typed text. The voice, which can track text responses as described above, can be provided via Voice Over IP (VoIP), telephone, and the like. Devices and techniques for providing voice interaction are well known to one of ordinary skill in the art. In addition, while in exemplary embodiments the term query may be used since a user is typically at least initially requesting some type of information, it is understood that query should be construed broadly to include any type of message or input.

The exemplary system method embodiments outlined above are advantageous for a variety of reasons. For instance, the customer can pose a relevant question to the conversational agent 228 and receive in return a relevant answer. Unlike graphical user interface alternatives, for example, in the system of the current invention, there is no need to navigate through layers of links, and there is no need to evaluate a list of potentially useless responses to see if any are appropriate. Further, the system of the present invention is interactive; when a customer's request needs refinement, the conversational agent 228 is programmed to ask follow-up questions. This contrasts with a graphical user interface setup where generally interactive conversation is unavailable. Compared to traditional call centers, the current invention also reduces overhead expenses associated with responding to customer queries by reducing the number of customer interactions with live agents, and also the duration of the interactions.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method performed by an automated service agent, comprising:

receiving a first textual message containing a first query from a first client associated with a user;

initiating a case record responsive to the first textual message;

determining a response to the first textual message;

providing the response to the first client;

receiving a second textual message containing a second query from the first client;

determining transferring the case record to a live agent if the second query substantially matches the first query; and transferring the case record to the live agent responsive to said determination.

2. The method according to claim 1, wherein providing the response comprises providing conversational responses to the user.

3. The method according to claim 1, wherein transferring the case record includes offering the user communication with a live agent.

4. The method according to claim 3, wherein the offer of communication includes one or more of telephone, instant messaging, and Internet chat.

5. The method according to claim 4, wherein the offer of communication includes a request for contact information for the user.

6. The method according to claim 4, wherein the offer of communication includes providing contact information for the live agent.

7. The method according to claim 1, wherein transferring the case record includes generating a communication for the live agent indicating that the live agent should contact the user.

8. The method according to claim 7, wherein transferring the case record includes providing an indication to the user, via the first client, that the live agent will contact the user at a given telephone number.

9. The method according to claim 1, further including storing the case record and providing the case record to the live agent.

10. The method according to claim 1, further comprising retrieving a list of related queries stored in a database, each related query associated with a response.

11. The method according to claim 10, wherein determining the response to the first textual message includes evaluating a similarity between the first query contained in the first textual message and each of the related queries retrieved from the database.

12. The method according to claim 11, wherein providing the response to the first client includes providing a response associated with a related query most similar to the first query contained in the first textual message.

13. The method according to claim 1, further comprising initiating a session between the first client and the automated service agent.

14. The method according to claim 1, further including sending a communication addressed to a call center indicating that the case record has been transferred.

15. The method according to claim 1, further including categorizing the case record into a first one of a plurality of predetermined categories.

16. The method according to claim 15, further including:
generating a queue associated with the first one of the plurality of predetermined categories; and
placing the case record into the queue associated with the first one of the plurality of predetermined categories.

17. The method according to claim 16, further including requesting queue information associated with the queue for the first one of the plurality of predetermined categories, wherein the queue information includes an estimated wait time for the live agent.

18. The method according to claim 1, further including proposing a response to the first query to the live agent, the live agent selecting between sending the proposed response to the user and generating a different response to address the first query.

19. A conversational agent having stored thereon computer instructions, that when executed, perform a method, comprising:
receiving a first textual message containing a first query from a user;
determining a response to the first query by evaluating a similarity between the first query contained in the first textual message and one or more queries stored in a database;
providing a response associated with the most similar query stored in the database to the user;
receiving a second textual message containing a second query; determining escalating the user to a live agent if the second query substantially matches the first query; and
escalating the user to the live agent upon said determination.

20. A system comprising:
a first module associated with the system, receiving a first textual message containing a first query from a customer engaged in a conversation with a conversational agent;
a second module associated with the system, storing predetermined responses for answering the first query contained in the first textual message received from the customer;
a third module associated with the system, determining automatically transferring the customer from the conversational agent to a live agent responsive to receiving a subsequent textual message containing a second query that substantially matches the first query from the customer.

* * * * *